(12) United States Patent
Easton et al.

(10) Patent No.: US 6,269,719 B1
(45) Date of Patent: Aug. 7, 2001

(54) ROLL-TRIMMING MACHINE (75) Inventors: Richard L. Easton, Angola; Jerry A. Bystry, Orland, both of IN (US)

(73) Assignee: SOS Service, Inc., Angola, IN (US)

( * ) Notice: Subject to any disclaimer, the term of this patent is extended or adjusted under 35 U.S.C. 154(b) by 0 days.

(21) Appl. No.: 09/370,746

(22) Filed: Aug. 9, 1999

(51) Int. Cl.[7] .................................................. B26D 3/00
(52) U.S. Cl. .............................. 83/54; 83/647.5; 83/649; 83/928
(58) Field of Search ............................. 83/13, 54, 647.5, 83/649, 928, 937

(56) References Cited

U.S. PATENT DOCUMENTS

| 2,512,164 | 6/1950 | Mann . | |
|---|---|---|---|
| 2,752,998 | * 7/1956 | Ferguson | ................... 83/928 |
| 3,174,369 | 3/1965 | Denk et al. . | |
| 3,213,731 | 10/1965 | Renard . | |
| 3,213,734 | 10/1965 | Nystrand . | |
| 3,292,470 | 12/1966 | Nystrand . | |
| 3,776,070 | * 12/1973 | Stoffels | ................... 83/649 |
| 4,020,726 | 5/1977 | Coats . | |
| 4,075,916 | 2/1978 | Fisher . | |
| 4,476,761 | 10/1984 | Bird . | |
| 4,579,025 | 4/1986 | Fasolak . | |
| 4,864,906 | 9/1989 | Hall . | |
| 5,060,456 | 10/1991 | Wehrli | ................... 53/492 |
| 5,271,137 | 12/1993 | Schultz . | |
| 5,367,930 | 11/1994 | Lemley . | |
| 5,410,929 | 5/1995 | Wallace . | |
| 5,453,070 | 9/1995 | Moody . | |

* cited by examiner

Primary Examiner—W. Donald Bray
(74) Attorney, Agent, or Firm—Van Dyke, Gardner, Linn and Burkhart, LLP (57) ABSTRACT A machine for cutting damaged ends off of rolls of wound sheet material includes a saw that moves in a circular motion about the circumference of one end of the roll of material. The circular motion of the saw is coupled with a movement of the saw radially inward toward the center of the axis of the circular movement. The roll is thereby cut in ever increasing depths about its circumference. The machine is mounted on a portable hydraulic lift and controlled by a remote controller positioned a safe distance away from the saw. The machine and the roll of material can be more easily aligned through the use of an alignment track.

32 Claims, 8 Drawing Sheets

ROLL-TRIMMING MACHINE

BACKGROUND OF THE INVENTION

This invention generally relates to a method and device for cutting the ends off of rolls of rolled sheet materials, especially paper.

A number of industries make use of large rolls of sheet material, such as paper. When these rolls of sheet material are moved within a warehouse, or moved between warehouses, it occasionally happens that one or both of the ends of the paper roll become damaged. Such damage can result from a variety of different mishaps. When such mishaps occur, it is desirable to still use the original paper roll to as great extent as possible. In this way, the entire roll does not have to be discarded because of one or more damaged ends.

In order to preserve and make use of the damaged roll of sheet material, it is desirable to remove the damaged portions of the roll of sheet material. This is accomplished by cutting the damaged portion, or portions, of the roll off so that the remaining, undamaged portions can be used.

In the past, the methods for removing the damaged ends of rolls of sheet material have been cumbersome and time-consuming. Typically, the damaged rolls could only be salvaged in a warehouse which had large, stationary machinery permanently on hand for dealing with the damaged rolls. Oftentimes, the paper rolls had to be reoriented so that their longitudinal axis pointed vertically before they could be cut by the roll-trimming machines. When the paper roll was oriented vertically, the damaged end was cut off of the top of the paper roll. The cutting, therefore, typically took place at an elevated height in the warehouse. Often an operator of the roll-trimming machine was required to position himself at an elevated height in order to operate the machine. Working at such an elevated height increases the potential dangers to an operator of the equipment. Additionally, the act of reorienting the paper roll to a vertical orientation requires fairly significant time and labor. It is desirable to eliminate or reduce this time and labor.

When rolls of paper, or other sheet material, are cut, there is typically a significant amount of dust and debris which is generated by the cut. When a roll of paper is oriented vertically, the paper dust is typically free to fall completely over the paper roll itself. Because the cutting is performed at a higher vertical height, the paper dust also falls a greater distance and has a tendency to otherwise spread out to a greater degree. The containment of such dust to as small a confined area as possible is desirable. The smaller the area of dust, the easier the subsequent clean-up. The act of cutting an end of a roll of sheet material off of the roll also normally entails a number of safety considerations. The safety considerations deal in great part with the issue of ensuring the safety of an operator while he or she is working in close proximity to a powerful saw blade. The Occupational Safety and Health Administration (OSHA) includes regulations dealing with such situations. These OSHA safety regulations have often, in the past, required special designs for the cutting machine, or special procedures for using the machine. It is desirable to have a paper-cutting machine that meets all safety standards while not requiring expensive or complicated engineering or designs.

SUMMARY OF THE INVENTION

According to one aspect of the present invention, a wheeled, portable paper-cutting machine is provided for cutting the ends off of rolls of paper. By having a portable paper-cutting machine, it is not necessary to move the paper roll to the cutting machine, but rather the cutting machine can be moved to the paper roll. This can greatly improve the efficiency of salvaging the damaged paper roll, with a minimum of disruption in the overall operations of the warehouse.

According to another aspect of the invention, a method is provided for cutting the ends off of rolls of wound sheet material. The sheet material which is to be cut is rolled on a core, and a saw blade and center shaft are provided. The center shaft is aligned with the core of the sheet material, and the saw blade is rotated around the circumference of the roll of material. As the saw blade rotates around the circumference of the roll of material, the distance between the saw blade and the center shaft is decreased. This decreasing distance causes the saw blade to cut into the roll of paper and eventually cut off an end of the roll of sheet material.

According to other aspects of the present invention, a roll-trimming machine for cutting the ends off of a roll of wound sheet material is provided. The roll-trimming machine includes a base on which a center shaft is mounted. A rotary arm is mounted to rotate around a longitudinal axis defined by the center shaft. A saw is mounted on one end of the rotary arm, and a drive is provided which is adapted to move the saw toward the longitudinal axis of the center shaft while the rotary arm rotates.

The embodiments of the present invention provide a simple and efficient manner for trimming the ends off of rolls of sheet material, such as paper. The portable nature of the roll-trimming machine allows the machine to be moved to the site of the damaged paper roll, rather than requiring the paper roll to be moved. The roll-trimming machine is designed to be used for trimming the ends off of a roll while the roll is horizontally oriented, rather than vertically oriented. This simplifies the roll-trimming process. The portability and simplicity of the roll-trimming machine allow it to be used by customers who otherwise might not be able to afford the capital investment of a permanent roll cutter positioned in their plant. Because of its portability, the roll-trimming machine of the present invention can be rented to customers when the need arises or used as part of a roll-trimming service provided by a third party.

DETAILED DESCRIPTION OF THE PREFERRED EMBODIMENTS

The present invention will now be described with reference to the accompanying drawings wherein like reference numerals correspond to like elements in the several drawings.

Figure 1:
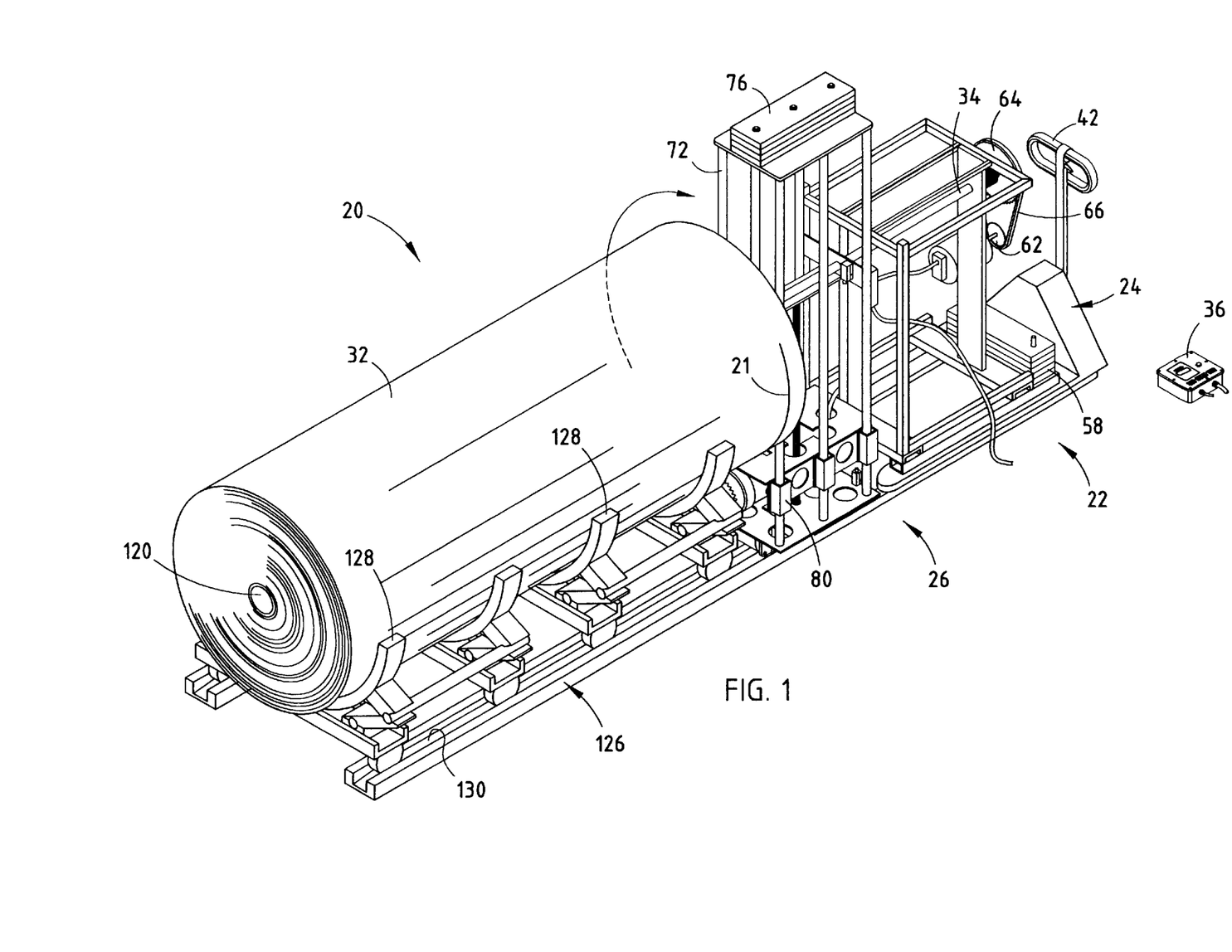
FIG. 1 is a perspective view of a roll-trimming machine according to one embodiment of the present invention shown positioned on an alignment track with a roll of sheet material which is to be trimmed.
Figure 2:
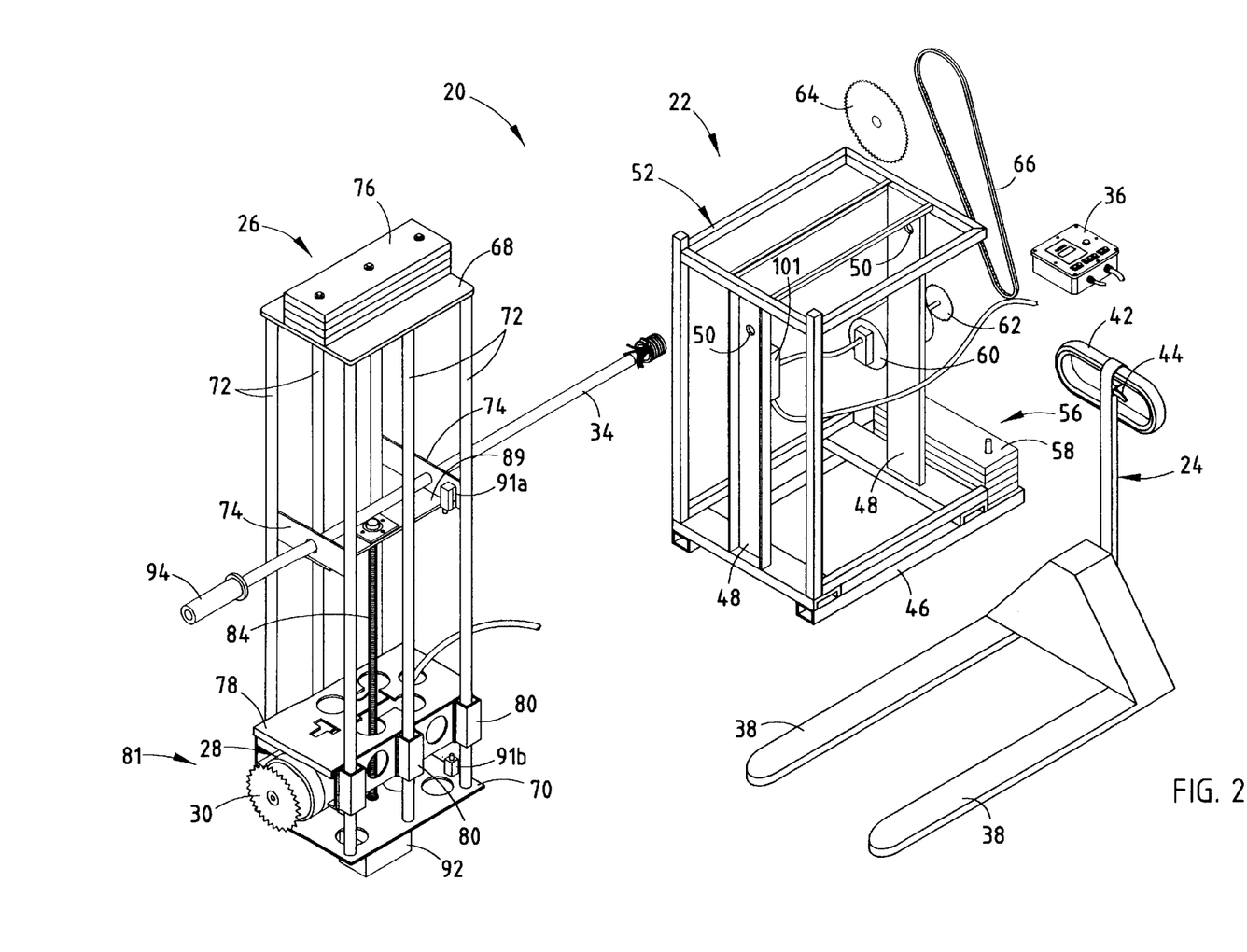
FIG. 2 is an exploded, perspective view of the roll-trimming machine of FIG. 1.

A roll-trimming machine 20 according to one embodiment of the present invention is depicted in FIGS. 1 and 2. Roll-trimming machine 20 provides a safe and easy device for salvaging rolls of sheet material by cutting off any damaged ends they may have. While roll-trimming machine 20 is primarily designed for cutting rolls of paper, it will be understood that other types of wound sheet material could be cut. For purposes of description herein, roll-trimming machine 20 will be described for use with a paper roll with the understanding that other types of sheet material can be used.

Roll-trimming machine 20 generally includes a base 22 which is mounted on a hydraulic lift 24. A rotary arm unit 26 is rotatably mounted on base 22. A saw 28 is mounted on one end of rotary arm unit 26 and includes a flush face saw blade 30 which cuts a roll of paper or other sheet material 32 at a desired location. The cutting of roll 32 is accomplished by rotating rotary arm unit 26 about a center shaft 34 while simultaneously moving saw 28 radially inward toward center shaft 34. This type of saw motion cuts the paper 32 by cutting the roll about its circumference in ever-increasing depths until the core of the roll has been reached. The beginning portion of a cut line 21 is shown in FIG. 1 as the saw rotates in the direction of the arrow. The control of roll-trimming machine 20 is carried out by a remote control box 36 which is electrically coupled to the roll-trimming machine by one or more wires. The wires are preferably long enough to allow the operator to be positioned at a safe distance away from the roll-trimming machine 20 while it is being operated.

Base 22 is mounted on a standard hydraulic lift 24 that includes two fork prongs 38 for lifting and moving pallets by hand (FIGS. 1 and 2). Base 22, in the current embodiment, is permanently affixed to fork prongs 38 of hydraulic lift 24. Hydraulic lift 24 includes one or more wheels 40 on its bottom side (FIGS. 4 and 5) which allow it to be pushed to any desirable location. Hydraulic lift 24 further includes a handle 42 which can pivot downward and away from fork prongs 38. The downward pivoting of handle 42 causes the fork prongs 38 to elevate higher and higher. A release lever 44 on handle 42 allows the fork prongs 38 to descend for as long as the release lever 44 is activated. Hydraulic lift 24 thereby allows adjustments to be made in the height of base 22, including center shaft 34. In an alternative embodiment, base 22 could be mounted onto the prongs of a fork-lift truck, if desired. Such an arrangement would give the roll-trimming machine a greater range of height adjustability and allow it to be transported more easily.

Base 22 includes a bottom 46 on which a pair of shaft supports 48 are fixedly secured (FIGS. 1 and 2). Shaft supports 48 are oriented generally vertically and each includes a shaft aperture 50 at its top end. Shaft apertures 50 are aligned with each other and are adapted to rotatably support center shaft 34. A frame 52 is also mounted to bottom 46 and generally defines a box-like structure. Frame 52 is generally shaped the same as a cover 54 (see FIGS. 4 and 5) which fits over frame 52 and houses the interior of base 22. Cover 54 also prevents dust from collecting on the interior components and serves as a safety shield against the moving parts housed therein. A rear portion 56 of base 22 includes an area on bottom 46 for stacking a series of counterweights 58. Counterweights 58 are stacked in sufficient number to ensure that roll-trimming machine 20 does not tip forward at any time. Rear portion 56 of base 22 also includes a rotary motor 60 which is mounted to the rear shaft support 48 in the current embodiment. Rotary motor 60 includes a drive gear 62 which is rotated by rotary motor 60. Drive gear 62 is coupled to a center shaft gear 64 by a chain 66. In the current embodiment, to achieve a desirable speed and torque, the diameter of center shaft gear 64 is substantially larger than the diameter of drive gear 62. As would be understood by one skilled in the art, various modifications to the ratio of drive gear 62 and center shaft gear 64 can be made. In the current embodiment, the arrangement of rotary motor 60, drive gear 62, and center shaft gear 64 is such that center shaft 34 will rotate at a speed in the general neighborhood of two revolutions per minute. Wide variations to this speed can, of course, be made, provided that an acceptable cut of the sheet material is still maintained.

Figure 3:
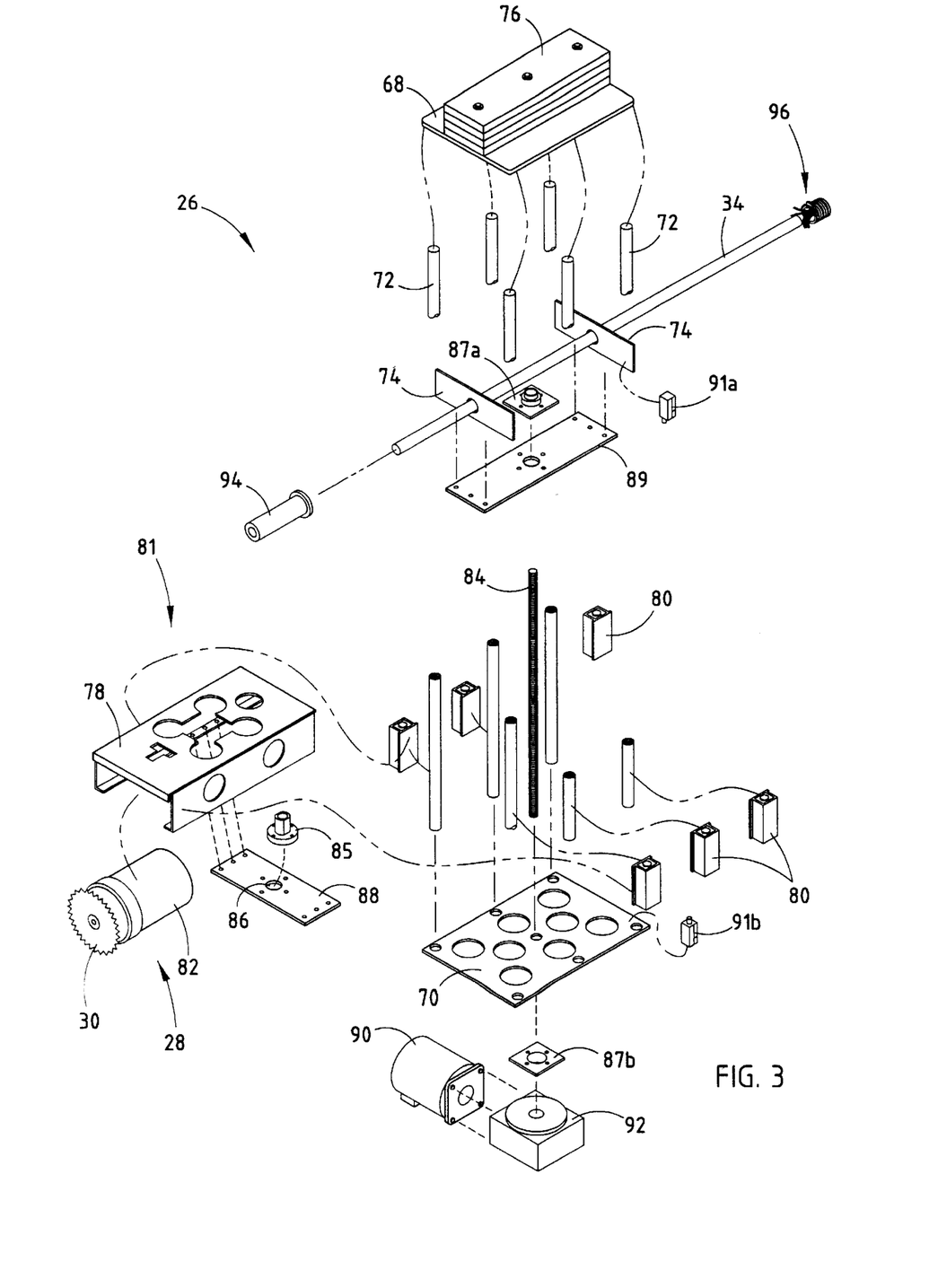
FIG. 3 is an exploded, perspective view of a rotary arm assembly.

Center shaft 34 is rotatably supported in shaft apertures 50 on shaft supports 48. Central shaft 34 extends forwardly from base 22 and supports rotary arm unit 26. Rotary arm unit 26 is thereby able to rotate with respect to base 22. Rotary arm unit 26 includes a top plate 68 and bottom plate 70 which are secured together by six connecting shafts 72 (FIGS. 1–3). Connecting shafts 72 are all oriented generally parallel to each other and are grouped in three pairs. A pair of center plates 74 are located midway between the ends of four of the connecting shafts 72. Center plates 74 connect the connecting shafts 72 to center shaft 34. A set of counterweights 76 are secured to one end of rotary arm unit 26 on top of top plate 68. Counterweights 76 are sufficient in number to provide a weight which substantially balances the weight on the opposite end of rotary arm unit 26. The rotation of rotary arm unit 26 is, therefore, balanced and does not create an eccentric motion.

A movable plate 78 is slidingly secured to connecting shafts 72 between top and bottom plates 68 and 70 (FIG. 3). A saw motor assembly 81 is slidingly secured to connecting shafts 72 by way of six linear bearings 80. Saw motor assembly 81 comprises a movable plate 78, a saw motor 82, an internally threaded cylindrical member 85, and a driving plate 88. Saw motor assembly 81 moves radially inwardly and outwardly from center shaft 34. The movement of saw motor assembly 81 toward and away from an axis defined by center shaft 34 causes saw motor 82 to likewise move toward and away from this axis. The movement of saw motor assembly 81 is actuated by a center, threaded shaft 84 which matingly engages an internally threaded cylindrical member 85. Threaded member 85 is mounted to driving plate 88 such that its internal cylindrical opening aligns with an aperture 86 defined in driving plate 88. Driving plate 88 and cylindrical member 85 are fixedly secured to the underside of movable plate 78. Rotation of center, threaded shaft 84 therefore causes driving plate 88 to move toward or away from center shaft 34, depending upon the direction of rotation of threaded shaft 84. Because driving plate 88 is fixedly secured to movable plate 78, which in turn has saw motor 82 secured to it, the entire saw motor assembly 81 moves when shaft 84 is rotated. The ends of threaded shaft 84 are mounted in a pair of end pieces 87a and b which allow shaft 84 to rotate. End piece 87*a* is mounted on top of a support member 89 which is, in turn, secured to the two center plates 74. End piece 87*b* is mounted to the underside of bottom plate 70.

The rotation of center, threaded shaft 84 is carried out by a feed motor 90 secured underneath bottom plate 70. Feed motor 90 is operatively coupled to a gear box 92 which is also operatively coupled to threaded shaft 84. Activation of feed motor 90 therefore causes threaded shaft 84 to rotate, thereby moving saw motor assembly 81 either toward or away from center shaft 34. The movement of saw motor assembly 81 is partially controlled by a pair of limit switches 91*a* and *b*. Limit switches 91*a* and *b* are positioned adjacent center shaft 34 and bottom plate 70, respectively (see FIGS. 3 and 6). Each limit switch 91 is a battery-powered, radio signal emitting switch. When saw motor assembly 81 moves radially inward toward center shaft 34, it will eventually contact limit switch 91*a*. When contact is made with switch 91*a*, it emits a radio signal to control box 36 which causes feed motor 90 to stop. In a similar manner, when saw motor assembly 81 moves radially outward to bottom plate 70, it eventually contacts limit switch 91*b*. Limit switch 91*b* will emit a radio signal to control box 36 which causes feed motor 90 to stop. Limit switches 91*a* and *b* thereby prevent motor assembly 81 from moving past the ends of threaded shaft 84. As described more fully below, the shutdown of feed motor 90 by limit switches 91*a* and *b* can be manually overridden, if necessary, to fully complete the cut.

Center shaft 34 includes a center guide 94 removably attached to the front end of center shaft 34. Center guide 94 is selectively removable to allow different center guides to be attached to center shaft 34, which correspond to varying diameters of the core of the roll of paper 32. In other words, center guides of varying diameter can be attached to center shaft 34 in order to match the diameter of the core of the roll of material which is to be trimmed. Center guide 94 is preferably made from an ultra-high molecular weight polypropylene. Center shaft 34 is made from a solid, cylindrical piece of steel in the current embodiment. Center shaft 34 extends forwardly from base 22 a sufficient distance to give center shaft 34 some flexibility at its forward-most end. This flexibility allows adjustments to be made in the alignment of shaft 34 with the axis of the paper roll 32, as described in more detail below.

Figure 4:
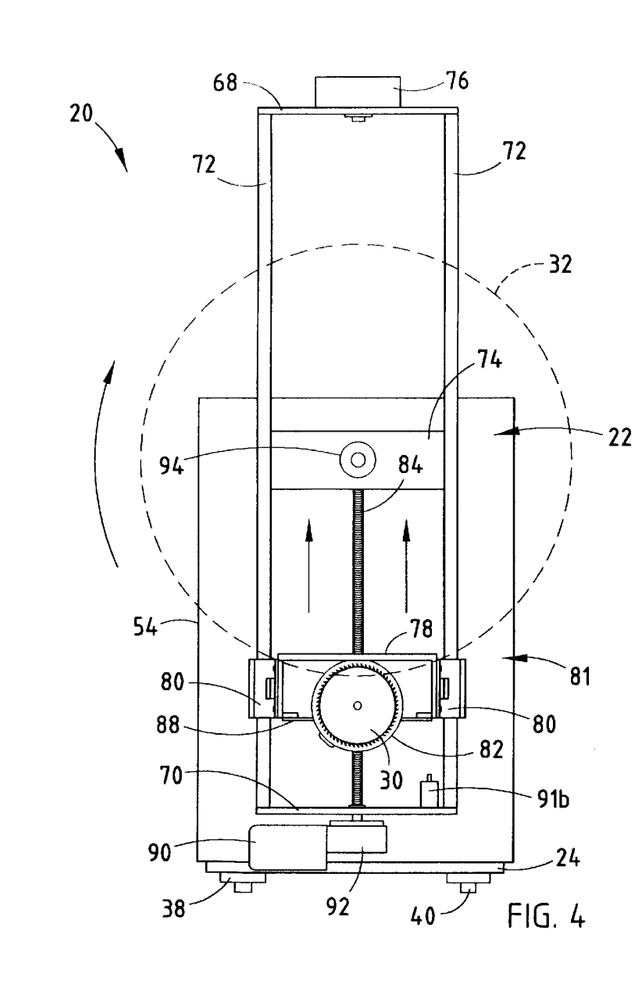
FIG. 4 is a front, elevational view of the roll-trimming machine with a vertically oriented rotary arm.
Figure 5:
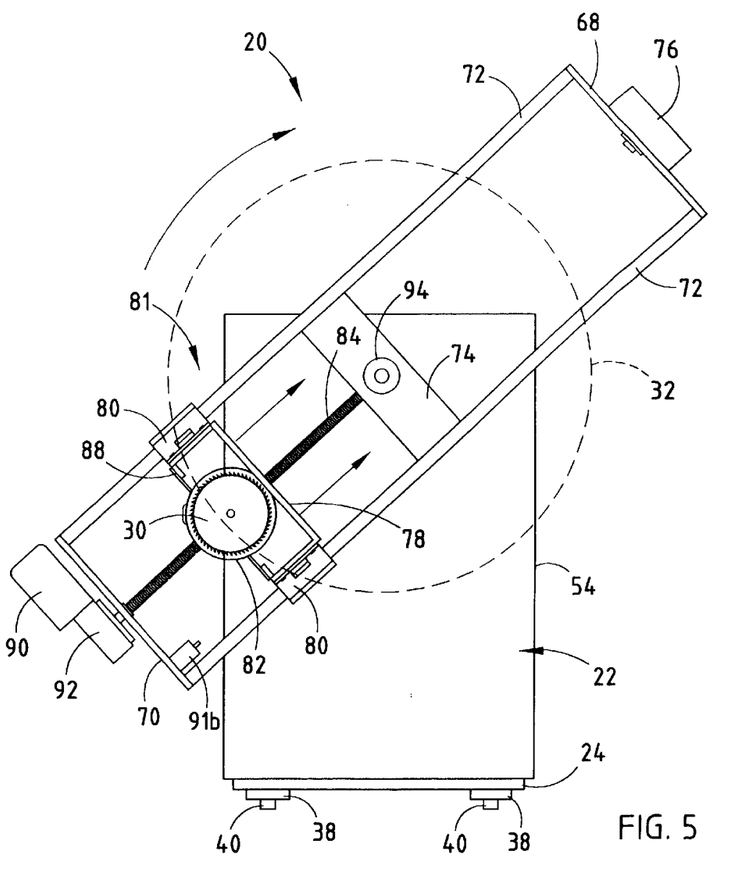
FIG. 5 is a front, elevational view of the roll-trimming machine of FIG. 4 wherein the rotary arm has rotated clockwise about forty-five (45°) degrees.

FIGS. 4 and 5 depict the movement of rotary arm unit 26 and saw motor 82. In FIG. 5, rotary arm unit 26 is oriented generally vertically and saw motor 82 is positioned adjacent bottom plate 70 of rotary arm unit 26. In FIG. 5, rotary arm unit 26 has rotated roughly 45° in a clockwise direction while saw motor 82 has moved away from bottom plate 70 toward center shaft 34. In the current embodiment, it has been found that a rate of rotation of rotary arm unit 26 about center shaft 34 of roughly two to three revolutions per minute is acceptable. The speed of movement of saw motor 82 radially inward toward center shaft 34 is variable and dependent upon the circumference of the uncut portions of the paper at any given moment. When a roll of sheet material is first started to be cut, the saw must cut material around a greater diameter. Because of the greater diameter, it is desirable to have the saw move radially inward toward center shaft 34 at a slower speed during the initial portions of the cut. Thereafter, the speed of movement of saw motor 82 radially inward can be increased due to the reduced diameter of the uncut portions of the roll of sheet material. Feed motor 90, which controls the linear movement of saw motor 82, is, therefore, preferably a variable-speed motor. In the current embodiment, it has been found that a linear speed of saw motor 82 radially inward toward center shaft 34 of roughly one to two inches per minute is acceptable for cutting the outer diameter of a roll of sheet material. As noted, increases to this speed can be made as more material is cut. It will, of course, be understood by those skilled in the art that variations to the rotational speed of center shaft 34 and the linear speed of saw motor 82 can be made without departing from the principles of the present invention.

In the present embodiment, saw motor 82 includes a saw blade 30 which is a flush-cut blade. The face of saw blade 30 that faces the paper roll, therefore, is smooth, and there are no fasteners or other protrusions which extend forwardly from the saw blade toward the paper roll. This ensures that the resulting cut is completely smooth. It has been found that an acceptable cut can be accomplished by using a saw blade having a diameter of 7¼ inches and 24 teeth for a first, rough cut. Such a blade has been found to avoid the problem of paper getting stuck between the teeth which does not come free as the blade rotates. Saw blade 30, in the current embodiment, also has a kerf of ⅛ inch, although variations can, of course, be made to the saw blade size, teeth, and kerf. If material other than paper is being cut, a different type of blade may be more suitable, as would be understood by one skilled in the art.

After a first, rough cut has been made of the end of the paper roll, it is often desirable to smooth the cut end with a second, finishing cut. Such a second, finishing cut preferably uses the same diameter and same width saw blade, but has 40 teeth instead of 24. The larger number of teeth helps provide a smoother, more finished cut.

As saw motor assembly 81 rotates and moves radially inward, the cut end of the paper roll may obstruct the movement of saw motor assembly 81 by contacting the motor 82. This may be more of a problem if the amount of material being cut off the end of the roll is especially large. In order to avoid the problem of this obstruction, a series of cuts can be made into the end of the roll of paper with a hand saw, such as a Skil saw, prior to activating roll-trimming machine 20. The hand saw should be set to cut at a depth into the end of the paper roll that is equal to the length of the end being cut off. A series of cuts should be made with the hand saw that pass through the center of the paper roll, thus resulting in a pie-shaped arrangement of cuts. The hand saw cuts will allow the paper end being cut off to fall loosely to the ground as saw blade 30 moves radially inward. There will, therefore, be no paper build-up to obstruct the movement of saw motor 82.

In the current embodiment, rotary motor 60, saw motor 82, and feed motor 90 are all AC motors which receive their electrical power from a 220V AC power line. Of course, other voltages and types of power supplies could be used within the scope of the present invention. The delivery of power from base 22 to feed motor 90 and saw motor 82 is accomplished through the use of a slip-ring assembly 96 (see FIGS. 6 and 7). Slip-ring assembly 96 is a standard high amperage slip-ring assembly of sufficient diameter to accommodate center shaft 34. Slip-ring assembly 96 includes a ring cylinder 93 having a series of six separate conductive rings 95*a–f*. Ring cylinder 93 receives center shaft 34 and is securely fastened to it such that ring cylinder 93 will rotate with center shaft 34. Each of the rings is separately coupled to wires 99*a–f*. A series of six stationary contacts 105 are fixedly attached to base 22 by mounting pins 97. Each stationary contact 105 makes sliding electrical contact with one of the conductive rings 95*a–f* and thereby allows power to be delivered to the motors on rotary arm unit 26. Specifically, three of the rings 95 are coupled by three of wires 99 to feed motor 90. Two of rings 95 are coupled by two of the wires 99 to saw motor 82. The final ring 95 provides a ground coupling between rotary arm unit 26 and base 22.

Figures 6, 7, 8:
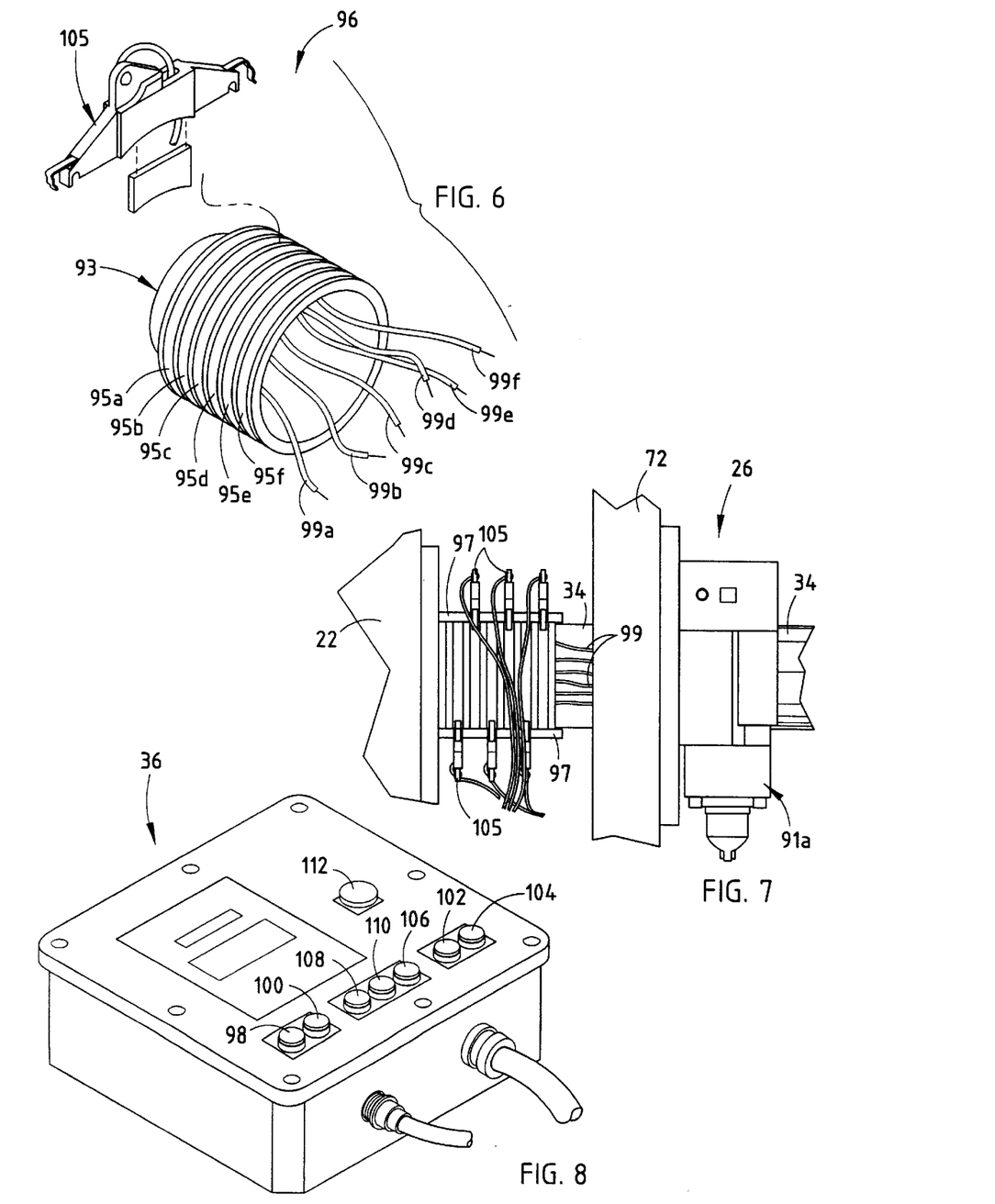
FIG. 6 is a perspective view of a slip-ring assembly depicted with a single ring.
FIG. 7 is a partial, side-elevational view of a slip-ring assembly and adjacent components on the roll-trimming machine.
FIG. 8 is a perspective view of one embodiment of a control box for controlling the roll-trimming machine.

The operation of rotary motor 60, saw motor 82, and feed motor 90 is controlled by control box 36 (FIG. 8). Control box 36 is positioned remotely from base 22 and operatively connected thereto by an electrical cable. The electrical cable is connected to a junction box 101 on base 22. Each of the motors on the roll-trimming machine receives its power through junction box 101. Control box 36 includes eight different buttons which are used for controlling roll-trimming machine 20. Start and stop buttons 98 and 100 are used to start and stop saw motor 82. Another set of start and stop buttons 102 and 104 are used to control rotary motor 60. A start, stop, and fast button 106, 108, and 110, respectively, are used to control feed motor 90. As mentioned previously, feed motor 90 is a variable-speed motor. By depressing the fast button 110 after feed motor 90 has been started, the rotation of feed motor 90 will progressively increase for as long as fast button 110 is depressed. By increasing the speed of feed motor 90, the rotation of center threaded shaft 84 will increase and, thereby, cause saw motor 82 to move radially inward toward center shaft 34 at a greater rate. An emergency stop button 112 is also located on control box 36. Depressing emergency stop button 112 causes all three of the motors located on roll-trimming machine 20 to immediately shut down.

Figure 9:
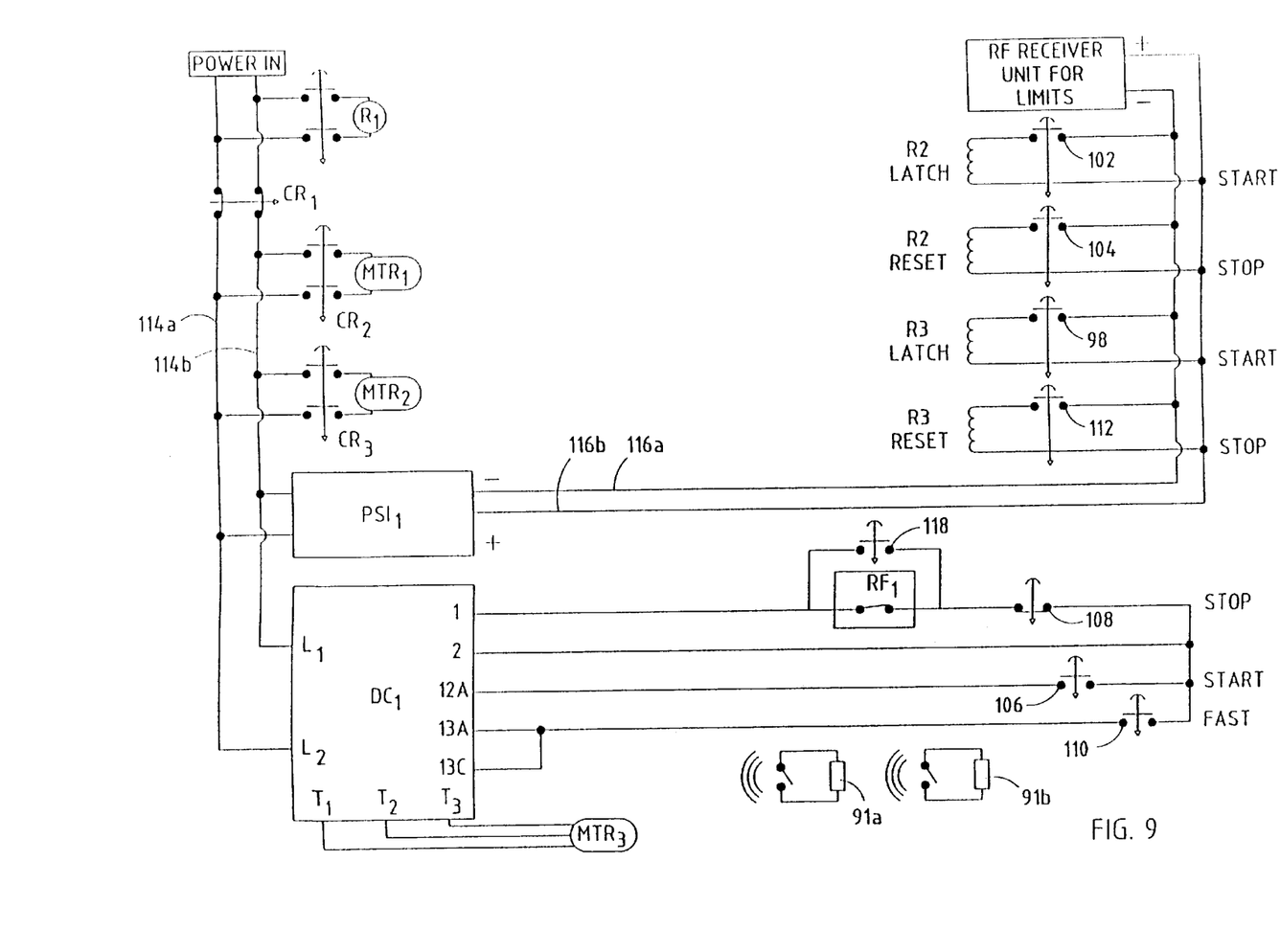
FIG. 9 is an electrical schematic diagram of the electrical control system of the motors of the roll-trimming machine.

FIG. 9 depicts an electrical schematic of control box 36. One of the main components in control box 36 is a programmable drive controller $DC_1$. Programmable drive controller $DC_1$ is a conventional variable-speed AC motor driver. In the current embodiment, drive controller $DC_1$ is a Model Number M1205SC marketed by AC Technology Corporation, of Oxbridge, Mass. Of course, any variable-speed motor controller could alternatively be used. A power supply $PS_1$ is also depicted in FIG. 9 and is coupled directly to a pair of power lines 114*a* and *b*. Power supply $PS_1$ converts the 220V AC power lines 114*a* and *b* to 12V DC output lines 116*a* and *b*. The emergency stop button 112 is positioned in series between power lines 114*a* and *b* and a relay $R_1$. When emergency stop button 112 is depressed, relay $R_1$ is activated and thereby causes control relay $CR_1$ to be activated in the direction shown by the corresponding arrow. The activation of control relay $CR_1$ disconnects power lines 114*a* and *b* from all of the motors on roll-trimming machine 20 and the remaining circuitry inside of control box 36.

Power supply $PS_1$ supplies power to a first latching relay $R_2$ and a second latching relay $R_3$, along with an RF receiver for the limit switches. When start button 102 is depressed, latch $R_2$ is activated causing control relay $CR_2$ to move in the direction indicated by the corresponding arrow. When control relay $CR_2$ moves as indicated, power is supplied directly from power lines 114*a* and *b* to rotary motor 60. When stop button 104 is depressed, latch $R_2$ is reset, and control relay $CR_2$ moves in the opposite direction, thereby interrupting the power to rotary motor 60 and stopping it. When start button 98 is depressed, latch $R_3$ activates control relay $CR_3$ in the direction indicated by the adjacent arrow. This activation of control relay $CR_3$ couples saw motor 82 directly to power lines 114*a* and *b* and thereby activates saw motor 82. Depressing stop button 100 resets latch $R_3$ and causes control relay $CR_3$ to interrupt the power flow to saw motor 82 and thereby stop it. The RF receiver which receives power from power supply $PS_1$ supplies power for switch $RF_1$ as discussed below.

Start, stop, and fast buttons 106, 108, and 110, respectively, are each operatively coupled to programmable drive controller $DC_1$. The designations $L_1$, $L_2$, $T_1$, and #1, etc., all refer to the terminals of the variable-speed AC motor drive manufactured by AC Technology, as discussed previously. Feed motor 90 is controlled by start, stop, and fast buttons as discussed above. A radio frequency limit switch $RF_1$ is connected in series between stop button 102 and an input #1 into drive controller $DC_1$. When either of the limit switches 91*a* and *b* on roll-trimming machine 20 is activated, a radio frequency signal is passed to control box 36 and opens switch $RF_1$. By opening switch $RF_1$, the feed motor 90 is stopped. A limit override switch 118 is connected in parallel to switch $RF_1$ and allows the opening of switch $RF_1$ to be manually overridden. Specifically, by depressing override switch 118, feed motor 90 can be operated despite the activation of either of the limit switches.

The operation of roll-trimming machine 20 is carried out by first inserting center shaft 34 into a core 120 on which the roll of sheet material is wound. This is accomplished by rolling the entire roll-trimming machine 20 straight towards the paper roll center core until the saw blade is located at a distance from the end of the roll that is equal to the amount of material that is to be cut off of the end of the roll. Because center shaft 34 may not be at precisely the same height as the core 120 of the sheet material roll 32, hydraulic lift 24 can be used to adjust the height of center shaft 34 as is necessary. Once the center shaft 34 and its center guide 94 are inserted into the core of the sheet material, rotary motor 60 is started in order to cause rotary arm unit 26 to begin to rotate. As rotary arm unit 26 rotates, the distance from the end of the roll to the cut-off point is confirmed at different points about the circumference of the paper roll. If the distance varies horizontally from left to right, the rear end of roll-trimming machine is adjusted either left or right to compensate for this horizontal variation. If the distance varies vertically from top to bottom, hydraulic lift 24 should be adjusted to raise or lower the rear end of roll-trimming machine 20. Because center shaft 34 is flexible, the raising or lowering of hydraulic lift 24 while center shaft 34 is inserted into the core of the sheet material roll will remove any vertical variations in the cut-off point. Once it has been confirmed that the cut-off points around the circumference of the sheet material roll are all at the same distance from the end of the roll, the roll-trimming machine is then aligned and ready for operation.

Figure 10:
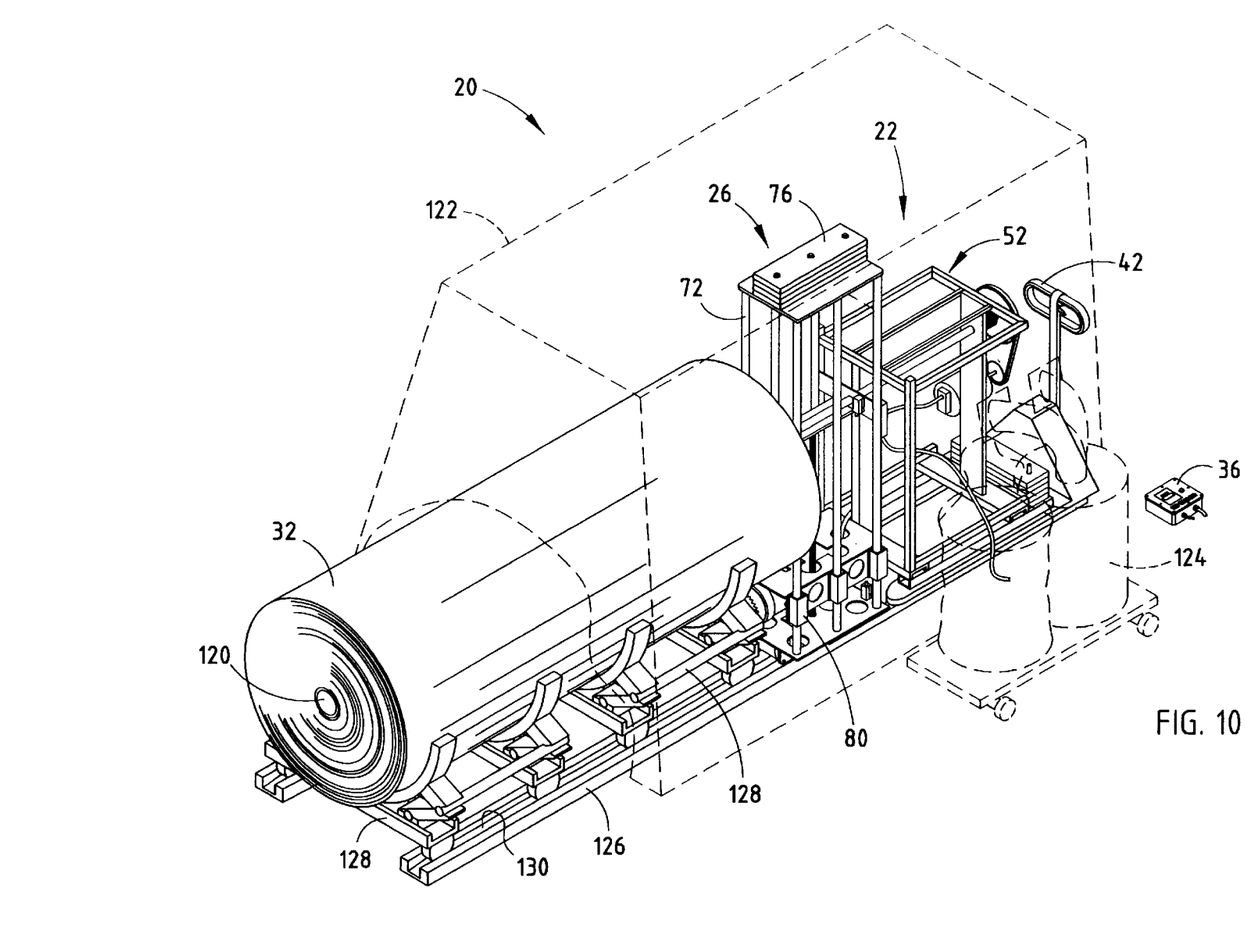
FIG. 10 is a perspective view of a dust collection system enclosing the roll-trimming machine and a portion of a roll being trimmed.
Figure 11:
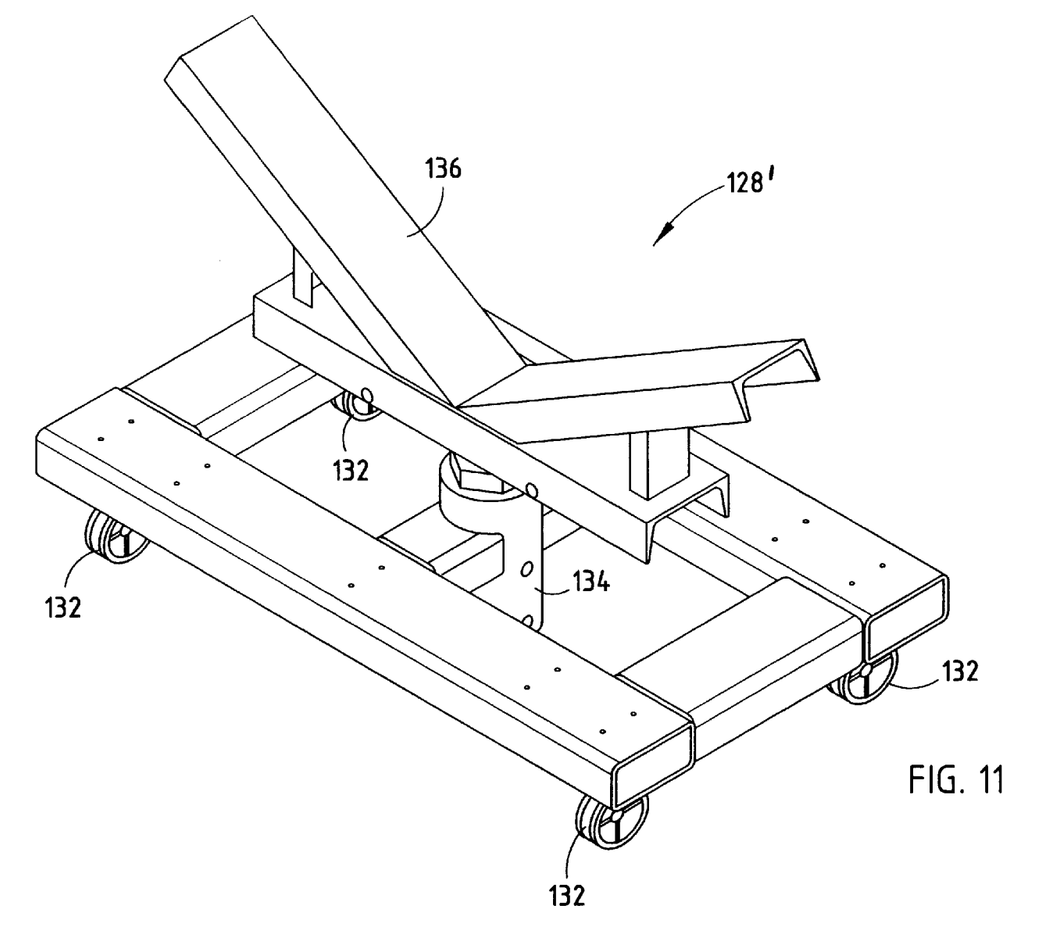
FIG. 11 is a perspective view of an alternate embodiment of a cradle for supporting the rail.

An alternative manner for carrying out the precise alignment of center shaft 34 with the core of the paper roll involves the use of alignment track 126 (FIGS. 1 and 10). Alignment track 126 provides a track on which both paper roll 32 and roll-trimming machine 20 are positioned. By positioning both of these on the same track, the alignment of center shaft 34 with the paper roll core is greatly facilitated. Alignment track 126 can take on a variety of different forms but should be constructed in such a manner as to ensure that the roll-trimming machine and paper roll are aligned straight with the track. One manner for ensuring this alignment is by providing channels 130 on the track for the wheels of roll-trimming machine 20 and the paper roll cradles. If the channels 130 are the same width as the width of the wheels, then there should be no room for improper alignment. In the current embodiment, the paper roll is positioned on two height adjustable cradles 128. The height of each of the cradles 128 can be independently adjusted, if necessary, in order to make fine-tuning adjustments in the vertical alignment of the roll-trimming machine with the paper roll. The channels 130 may include sloped ends in order to allow the wheels to be ramped up and into the channels. It will be understood that roll-trimming machine 20 can be used without alignment track 126, if desired, and that various modifications can be made to alignment track 126. It will be further understood that various types of cradles 128 can be used in conjunction with alignment track 126. One such alternative cradle 128' is depicted in FIG. 11. Cradle 128' includes four non-castered wheels 132 that are rigidly secured to cradle 128' such that cradle 128' can only be rolled in one direction. This helps ensure proper alignment of the paper roll with the roll-trimming machine. Cradle 128' further includes a height adjustment mechanism 134 for adjusting the height of a support bar 136. Height adjuster 134 can be a hydraulic, pneumatic, mechanical or any other conventional type of height adjustment mechanism.

The actual cutting of the roll of sheet material 32 typically tends to create a significant amount of airborne dust, especially if the sheet material is paper. In order to avoid distributing dust throughout a warehouse, a dust collection chamber 122 is positioned over the entire roll-trimming machine 20 and a portion of roll 32 (FIG. 10). Dust collection chamber 122 includes a conventional vacuum system 124 which helps contain the airborne dust particles by filtering the air through the vacuum system. Vacuum system 124 is activated prior to starting the roll-trimming process. After vacuum system 124 has been activated, saw motor 82 is activated, which causes the saw blade to rotate. Start button 106 is then depressed to cause saw motor 82 to move radially inward toward center shaft 34. As the saw blade moves radially inward, it comes into contact with the roll of sheet material 32 and begins to cut into the roll. After the outer diameter of the roll of sheet material has been cut, the speed of movement radially inward of the saw blade can be increased due to the decreased diameter. The increase in speed, if desired, is accomplished by depressing fast button 110. The amount of speed increase, or decrease, can be generally determined by watching the discharge from the saw blade. If the radially inward feed speed is too great, the saw will not be able to discharge the blade's kerf paper debris fast enough, and the saw may bog down or stall. In such a case, the radially inward feed speed should be decreased.

The saw blade will continue to cut the end off the roll of paper by cutting the roll in ever-decreasing circumferences. When the saw blade has reached center shaft 34, the upper limit switch will be activated, and the radially inward movement of saw motor 82 will stop. At this point, the entire end of the roll of sheet material should be cut off. If it is not, manual override button 118 can be depressed and saw motor 82 moved still closer to center shaft 34 to cut off any remaining portions of the roll. After the end of the roll has been trimmed off, the motors on the roll-trimming machine are shut off, and the dust collection chamber is removed. If additional fine cutting is desirable to smooth any roughness, the entire process can be repeated with a finer-toothed blade.

While the present invention has been described in terms of the preferred embodiments discussed in the above specification, it will be understood by one skilled in the art that the present invention is not limited to these particular preferred embodiments, but includes any and all such modifications that are within the spirit and scope of the present invention as defined in the appended claims.

The embodiments of the present invention in which an exclusive privilege or property is claimed are defined as follows:

1. A wheeled, portable paper roll-trimming machine for trimming the ends off of non-rotating rolls of paper.

2. The paper-roll trimming machine of claim 1 further including a controller for remotely operating said paper-roll trimming machine.

3. A method for cutting the ends off of rolls of wound sheet material comprising:
   providing a roll of wound sheet material which is to be cut and which is rolled on a core, said roll of material having a circumference;
   providing a saw blade;
   providing a center shaft;
   substantially aligning said center shaft with said core;
   rotating said saw blade around the circumference of said roll of material while said saw blade cuts said material; and
   moving said saw blade toward said center shaft as said saw blade rotates about the circumference of said roll of material until an end of said roll of material has been cut off.

4. The method of claim 3 further including:
   adjusting the rate of movement of said saw blade toward said center shaft while said saw blade moves toward said center shaft.

5. The method of claim 3 further including:
   mounting said saw blade and said center shaft on a structure attached to a hydraulic lift.

6. The method of claim 3 further including:
   controlling the rotation and movement of said saw blade from a location remote from said roll of material.

7. The method of claim 3 wherein the end of a roll of paper is cut off while the core of the paper roll is oriented generally parallel to a floor on which said paper roll is located.

8. A roll trimming machine for cutting the ends off of a roll of wound sheet material comprising:
   a base;
   a center shaft supported by said base, said center shaft defining a longitudinal axis;
   a rotary arm mounted to rotate around said longitudinal axis of said center shaft, said rotary arm having a first and a second end;
   a saw mounted on said first end of said rotary arm; and
   a linear drive which is adapted to move said saw toward said longitudinal axis.

9. The roll trimming machine of claim 8 wherein said base is mounted on a hydraulic lift.

10. The roll trimming machine of claim 9 wherein said longitudinal axis is oriented generally parallel to a floor on which said hydraulic lift is located.

11. The roll trimming machine of claim 8 wherein said base includes wheels for moving said roll trimming machine from place to place.

12. The roll trimming machine of claim 8 further including a controller which controls how fast said linear drive moves said saw toward said longitudinal axis.

13. The roll trimming machine of claim 12 wherein said controller is located remotely from said base.

14. The roll trimming machine of claim 9 wherein said hydraulic lift is a pallet hydraulic lift.

15. The roll trimming machine of claim 9 wherein said linear drive comprises a motor and a threaded elongated shaft, and said saw is mounted on a plate having a threaded aperture which receives said threaded elongated shaft, said motor adapted to rotate said threaded elongated shaft and cause said plate to move toward or away from said longitudinal axis.

16. The roll trimming machine of claim 8 further including a center guide which is selectively mountable on an end of said center shaft, said center guide dimensioned to be inserted within a core on which the roll of sheet material is wound.

17. The roll trimming machine of claim 8 further including a plurality of center guides which are each selectively mountable on an end of said center shaft, said plurality of center guides being differently dimensioned for insertion into different size cores on which the roll of sheet material may be wound.

18. The roll trimming machine of claim 8 wherein said saw is adapted to cut paper.

19. A paper cutting machine for cutting the ends off of rolls of paper comprising:

a base;

a saw supported by said base, said saw adapted to cut the ends of the rolls of paper; and a hydraulic lift upon which said saw is mounted.

20. The paper cutting machine of claim 19 wherein said hydraulic lift is portable.

21. The paper cutting machine of claim 19 further including a rotary arm mounted on a center shaft that is rotationally supported on said base, said rotary arm adapted to rotate about a longitudinal axis defined by said center shaft, and said saw mounted on said rotary arm.

22. The paper cutting machine of claim 21 wherein said saw is adapted to move along said rotary arm toward and away from said longitudinal axis.

23. The paper cutting machine of claim 19 further including a controller for starting and stopping said saw, said controller being positionable remotely from said base.

24. The paper cutting machine of claim 21 further including a center guide selectively attachable to said center shaft, said center guide dimensioned to fit at least partially within a core upon which the roll of paper is rolled.

25. A roll trimming machine for trimming off the ends of rolls of sheet material wound on a core comprising:

a base;

a center shaft rotatably mounted on said base;

a first motor mounted on said base for rotating said center shaft;

a rotary arm mounted to said shaft; and a saw for trimming the ends off of the rolls of sheet material, said saw mounted on said rotary arm.

26. The roll trimming machine of claim 25 further including a second motor mounted on said rotary arm for powering said saw.

27. The roll trimming machine of claim 26 further including:

a plate on which said first motor is mounted;

a set of support shafts to which said plate is slidingly mounted; and an elongated threaded shaft rotatably mounted on said rotary arm, said elongated threaded shaft adapted to move said plate when said threaded shaft is rotated.

28. The roll trimming machine of claim 25 further including a controller which controls said saw and said first motor, said controller positioned remotely from said base.

29. The roll trimming machine of claim 28 wherein said controller is connected to said saw and said first motor by electrical wires.

30. A trimming machine for trimming a damaged end off of a cut table object comprising:

a longitudinal track having two ends, said cut table object positioned on said longitudinal track adjacent one end;

a cutting assembly positioned at an end of said track opposite said cut table object, said cutting assembly positioned adjacent the damaged end of said cut table object;

a saw blade movably mounted to said cutting assembly and positioned selectively around a periphery of said cuttable object at a selected longitudinal distance along said track from one end, one of said cuttable object and said saw blade being rotatable around an axis parallel to said longitudinal track during cutting of said object, sand saw blade adapted to be moved radially toward and away from said axis.

31. The trimming machine of claim 30 further including a controller for controlling the movement of said saw blade, said controller positioned remotely from said cutting assembly and said saw blade.

32. The trimming machine of claim 30 wherein said cuttable object is a roll of paper.

* * * * *

UNITED STATES PATENT AND TRADEMARK OFFICE
CERTIFICATE OF CORRECTION

PATENT NO. : 6,269,719 B1 Page 1 of 1
APPLICATION NO. : 09/370746
DATED : August 7, 2001
INVENTOR(S) : Richard L. Easton et al.

It is certified that error appears in the above-identified patent and that said Letters Patent is hereby corrected as shown below:

Column 12
Lines 21, 22, 25, and 26, "cut table" should be --cuttable--

Signed and Sealed this

Twenty-sixth Day of May, 2009

JOHN DOLL
*Acting Director of the United States Patent and Trademark Office*